(12) United States Patent
Lee (10) Patent No.: US 9,584,385 B2
(45) Date of Patent: Feb. 28, 2017

(54) ADAPTIVE BUFFER CONTROL

(75) Inventor: Yiu Leung Lee, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 136 days.

(21) Appl. No.: 13/354,146

(22) Filed: Jan. 19, 2012

(65) Prior Publication Data

US 2013/0188482 A1 Jul. 25, 2013

(51) Int. Cl.
*H04J 1/16* (2006.01)
*H04L 12/26* (2006.01)

(52) U.S. Cl.
CPC ...... *H04L 43/0852* (2013.01); *H04L 43/0894* (2013.01); *H04L 43/16* (2013.01)

(58) Field of Classification Search
CPC .......................................................... H04J 1/16
See application file for complete search history.

(56) References Cited

U.S. PATENT DOCUMENTS

| | | | | |
|---|---|---|---|---|
| 8,787,163 | B1* | 7/2014 | Nemavat et al. | 370/231 |
| 2002/0150123 | A1* | 10/2002 | Ro | 370/465 |
| 2003/0086372 | A1* | 5/2003 | Pate et al. | 370/235 |
| 2006/0109789 | A1* | 5/2006 | Skerritt | 370/238 |
| 2007/0233894 | A1* | 10/2007 | Ling et al. | 709/236 |
| 2008/0069138 | A1* | 3/2008 | Acharya et al. | 370/468 |
| 2010/0020686 | A1* | 1/2010 | Lee et al. | 370/231 |
| 2010/0098047 | A1* | 4/2010 | Zhou | H04L 47/10 370/345 |

OTHER PUBLICATIONS

Kung et al.; "Receiver-Oriented Adaptive Buffer Allocation in Credit-Based Flow Control for ATM Networks", Proc. INFOCOM, 1995, pp. 239-252 (15 pages total).
Li et al.; "Adaptive Buffer Sizing for TCP Flows in 802.11e WLANs"; Hamilton Institute, National University of Ireland at Maynooth, Ireland, Communications and Networking in China, 2008 (5 pages total).
Zhang et al.; "ABS: Adaptive buffer sizing for heterogeneous networks"; Computer Networks, No. 54, 2010, pp. 2562-2574 (13 pages total).

* cited by examiner

*Primary Examiner* — Chi H Pham
*Assistant Examiner* — Raul Rivas
(74) *Attorney, Agent, or Firm* — Banner & Witcoff, Ltd.

(57) ABSTRACT

A method, device, computer readable medium, and system are disclosed that in one aspect may calculate a data rate and a latency of a packet flowing through a buffer, compare the data rate to a provisioned data rate, compare the latency to a threshold, and adapt a size of the buffer in response to results of the comparisons.

36 Claims, 8 Drawing Sheets

ADAPTIVE BUFFER CONTROL

BACKGROUND

Data is frequently transmitted to and from users, such as consumers, over a network such as the Internet, cable, fiber, wireless, or satellite networks. A data modem is frequently used to modulate and demodulate data for transmission over the network. Data modems normally include one or more packet buffers to store incoming and outgoing packets, which may be transmitted using protocols such as UDP (User Datagram Protocol), which generally provides real-time non-guaranteed delivery of packets, and TCP/IP (Transmission Control Protocol/Internet Protocol), which generally guarantees delivery of packets. Upstream packets such as UDP packets containing voice data or TCP/IP packets containing uploaded pictures or videos are generally stored in the packet buffer until they can be accepted by the network.

The ability of a given network to accept packets from the packet buffer may depend on a service "tier" to which a given consumer or other user has access. Users who have access to higher levels of service may be provided with a higher bandwidth corresponding to an improved performance experience, whereas users who have access to lower levels of service may be provided with a lower bandwidth. These factors may affect the length of time that packets remain in the packet buffer. If the network is congested, packets may remain in the buffer for a longer period of time, leading to perceptible delays, especially for applications such as voice transmission.

When a data modem is "provisioned" for a particular user or class of users, one of the parameters that may be set is the size of the packet buffer. By setting the packet buffer to a large size, some packets may stay in the buffer for a long period of time, creating perceptible delays. By setting the packet buffer to a small size, the buffer may fill up quickly, leading to an underutilization of the provisioned data rate. A default packet buffer size may be provided, which may be based on an assumption that the provisioned user will have a high tier of service corresponding to high bandwidth. Once the packet buffer size is set, it is generally not changed for the user. It would be desirable to allow more flexibility by allowing the buffer size to be adapted over time based on one or more factors.

SUMMARY

Some or all of the various features described herein may assist in providing an adaptive buffer for buffering packets, such as UDP and TCP/IP packets.

In accordance with one illustrative embodiment, a method of controlling a buffer may include calculating a data rate of one or more types of packets flowing through the buffer, calculating a latency of the one or more types of packets flowing through the buffer, comparing the data rate with a provisioned data rate, comparing the latency with a predetermined threshold, and adapting a size of the buffer in response to results of the comparisons. The buffer size may be increased or decreased in real-time depending on a state of the buffer. The buffer can be used to buffer packets such as TCP and UDP packets.

A method of calculating data rate and latency may include sampling packets entering the buffer and tracking such packets to determine when they exit the buffer. Alternatively, a method may include periodically generating a test packet to calculate the data rate and latency for the buffer. Another method may include monitoring the buffer occupancy and data rate to calculate the latency of the buffer.

The disclosure also relates to memory, storing instructions that, when executed by a processor, cause the processor to perform steps of the methods described herein, and to one or more computing devices including the memory and processor.

Other details and features will also be described in the sections that follow. This summary is not intended to identify critical or essential features of the inventions claimed herein, but instead merely summarizes certain features and variations thereof.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Also, quantities or values (e.g., 128 KB) referred to herein may be used by way of example for purposes of clearly describing aspects of the present disclosure, and thus, such quantities/values may not be indicative of actual quantities/values. Accordingly, such quantities/values are not intended to limit the scope of the present disclosure.

Figure 1:
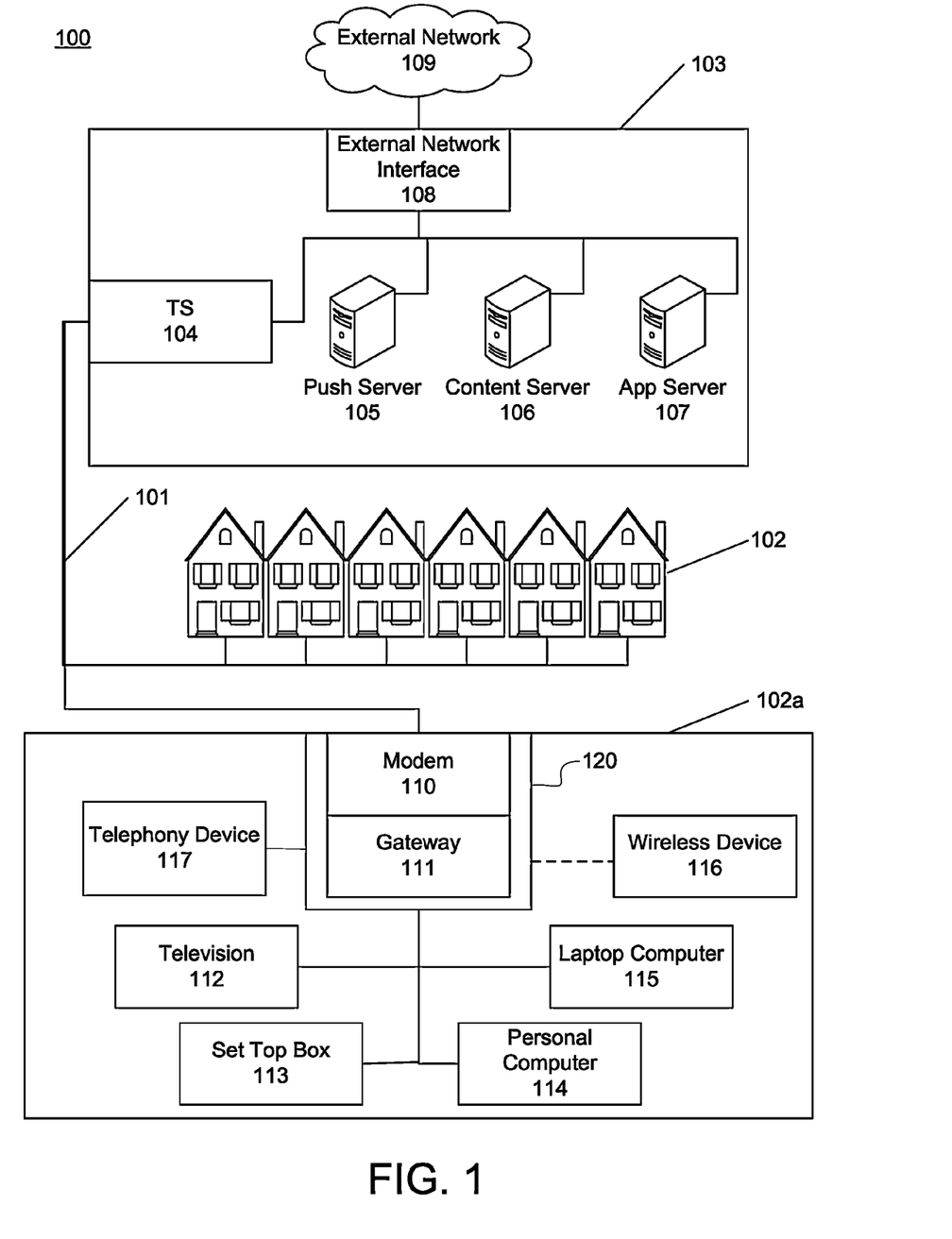
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication lines 101 (e.g., coaxial cables, optical fibers, wireless channels, etc.) to connect multiple premises 102 (e.g., businesses, homes, consumer dwellings, etc.) to a central office or headend 103. The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation may be significantly minimized, allowing a single central office 103 to reach even farther with its network of lines 101 than before.

The central office 103 may include a termination system (TS) 104, such as a cable modem termination system (CMTS), which may be a computing device configured to manage communications between devices on the network of lines 101 and backend devices such as servers 105-107 (to be discussed further below). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The TS may be able to receive, buffer, and transmit a variety of data, including TCP and UDP packets. The central office 103 may also include one or more external network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the external network interface 108 may include the corresponding circuitry needed to communicate on the external networks 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications) . The central office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user and/or device. Further, the content and other data of the content server 106 may be packaged in packets of various protocols.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the premises 102. Although shown separately, one of ordinary skill in the art will appreciate that the push server 105, content server 106, and application server 107 may be combined.

An example premises 102a, such as a home, may include a network interface 120. The network interface 120 may be able to receive, buffer, and transmit a variety of data, such as TCP and UDP packets. In one or more arrangements, the network interface 120 may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the premises 102a to communicate with the central office 103 and other devices beyond the central office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as televisions 112, additional STBs 113, personal computers 114, laptop computers 115, wireless devices 116 (wireless laptops, notebooks, tablets and netbooks, mobile phones, mobile televisions, personal digital assistants (PDA), etc.), telephony devices (e.g., IP telephony devices), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
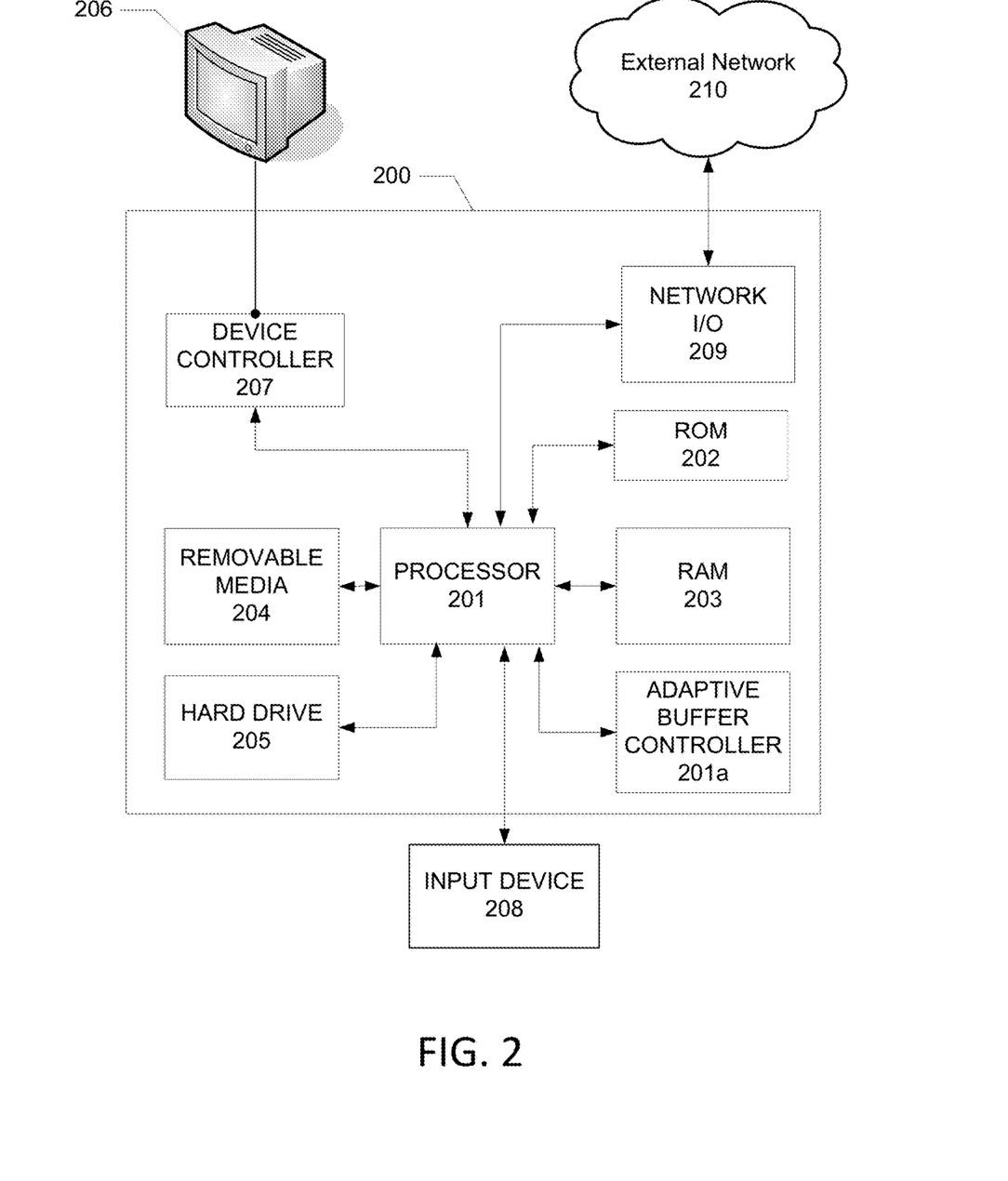
FIG. 2 illustrates an example computing device that can be used to implement any of the servers, entities, and computing devices described herein.

FIG. 2 illustrates general elements that can be used to implement any of the various computing devices discussed above. The computing device 200 may include one or more processors 201, which may execute instructions of a computer program to perform any of the features described herein. The instructions may be stored in any type of non-transitory computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication lines 101 discussed above, the external network 109, an in-home network, a provider's wireless, coaxial, fiber, or hybrid fiber/coaxial distribution system (e.g., a DOCSIS network), or any other desired network.

Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device). Additionally, for the adaptive buffer control process described herein, the computing device 200 may include an adaptive buffer controller 201a, which can perform the various control functions described herein as a replacement for, or augment to, any other processor 201 that the computing device 200 may include. The adaptive buffer controller 201a may also include internal secure memory (not shown), which can store various instructions, thresholds, and measurements described herein. The secure memory can be any desired type of memory, and can have enhanced security features to help restrict access (e.g., can only be accessed by the adaptive buffer controller 201a).

Any of the functions or steps described herein may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more tangible computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
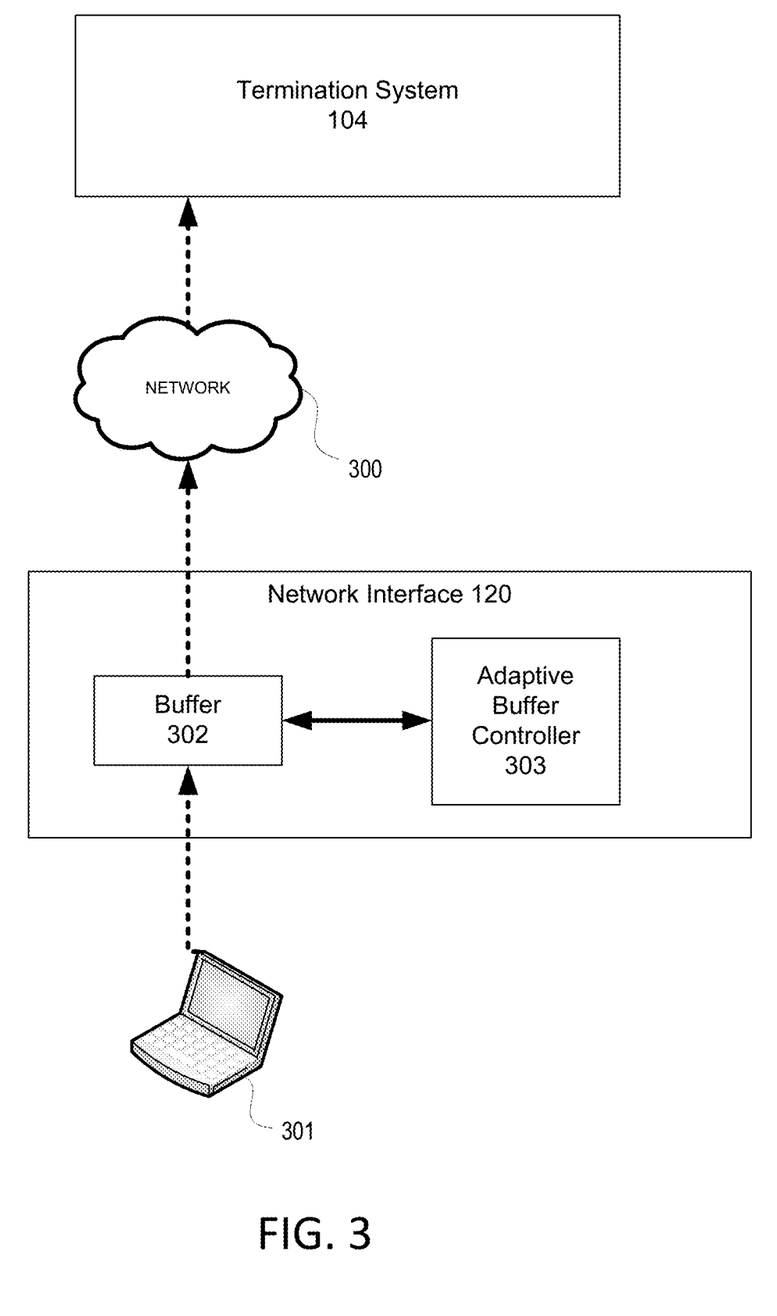
FIG. 3 illustrates a high-level diagram of the flow of packets through a system according to one or more aspects described herein.

Referring to FIG. 3, a high-level diagram of an example system in which an adaptive buffer control process may be implemented is shown. In one aspect, the system may include a termination system 104, such as a cable modem termination system (CMTS), a network 300, a network interface 120 (which may comprise, for example, a modem 110 and/or other device), and a user device 301. Also, in this example, the network interface 120 may include a packet buffer 302 and an adaptive buffer controller 303, which may be implemented in hardware, software, or a combination of both. Although FIG. 3 shows only the network interface 120 having the buffer 302 and the adaptive buffer controller 303, a buffer 302 and adaptive buffer controller 303 can be implemented in the termination system 104, network interface 120 (e.g., a modem 110), the user device 301, or any combination thereof. It is contemplated that the packet buffer 302 and adaptive buffer controller 303 can be implemented in any system or within any device where data packets are to be buffered. Data packets may include various types of packets sent in accordance with various types of protocols including both TCP packets and UDP packets at the same time.

For illustrative and explanatory purposes, only a single user device 301, a single network interface 120, and a single termination system 104 are depicted in FIG. 3. However, a plurality of user devices 301 may be connected to one or more network interfaces 120 (e.g., one or more modems 110), which may be connected to one or more termination systems 104 through the network 300. Moreover, different types of user devices 303, such as computers, laptops, smartphones, IP telephony devices, etc. may be connected to the same network interface 120 (e.g., the same modem 110).

Further, the buffer 302 may include one or more buffers, which may be included in the network interface 120 or at a separate location from the network interface 120. The buffer 302 is shown as a single element in FIG. 3 for convenience only. Also, a single adaptive buffer controller 303 can be used to control multiple buffers 302.

The solid arrow connecting the buffer 302 and adaptive buffer controller 303 represents the communication between the buffer and the adaptive controller 303. As described in further detail below, the adaptive buffer controller 303 may measure aspects of the buffer 302 and generate instructions to configure the buffer 302 based upon the measurements taken. The buffer 302 and adaptive buffer controller 303 may be configured with a closed loop design. That is, the buffer 302 and adaptive buffer controller 303 may operate together to control the buffer size without external control (e.g., external information or instructions). Herein, buffer size refers to the number of bits allocated to the buffer 302.

The dotted arrows in FIG. 3 represent an example of the flow of data packets through the system. In FIG. 3, the packets are shown as flowing upstream. However, the principles described herein may be applied in cases where the packets are transferred downstream as well. The packets may be transferred through one or more communication lines 101 (e.g., coaxial cables, optical fibers, wireless channels, etc.). As shown in FIG. 3, the data packets may be generated in the user device 301 and transferred to the network interface 120. The data packets received by the network interface 120 are stored in the buffer 302. The buffer 302 temporarily stores the data packets before outputting them to the termination system 104 via the network 300. The buffer 302 may function as a first-in-first-out queue thereby outputting packets in the order in which they are inputted.

As discussed previously, a large buffer size may cause packets to be retained in the buffer for a long time, leading to noticeable performance degradation, which may be undesirable for delay sensitive applications and services. An adaptive buffer mechanism may improve this performance.

Figure 4:
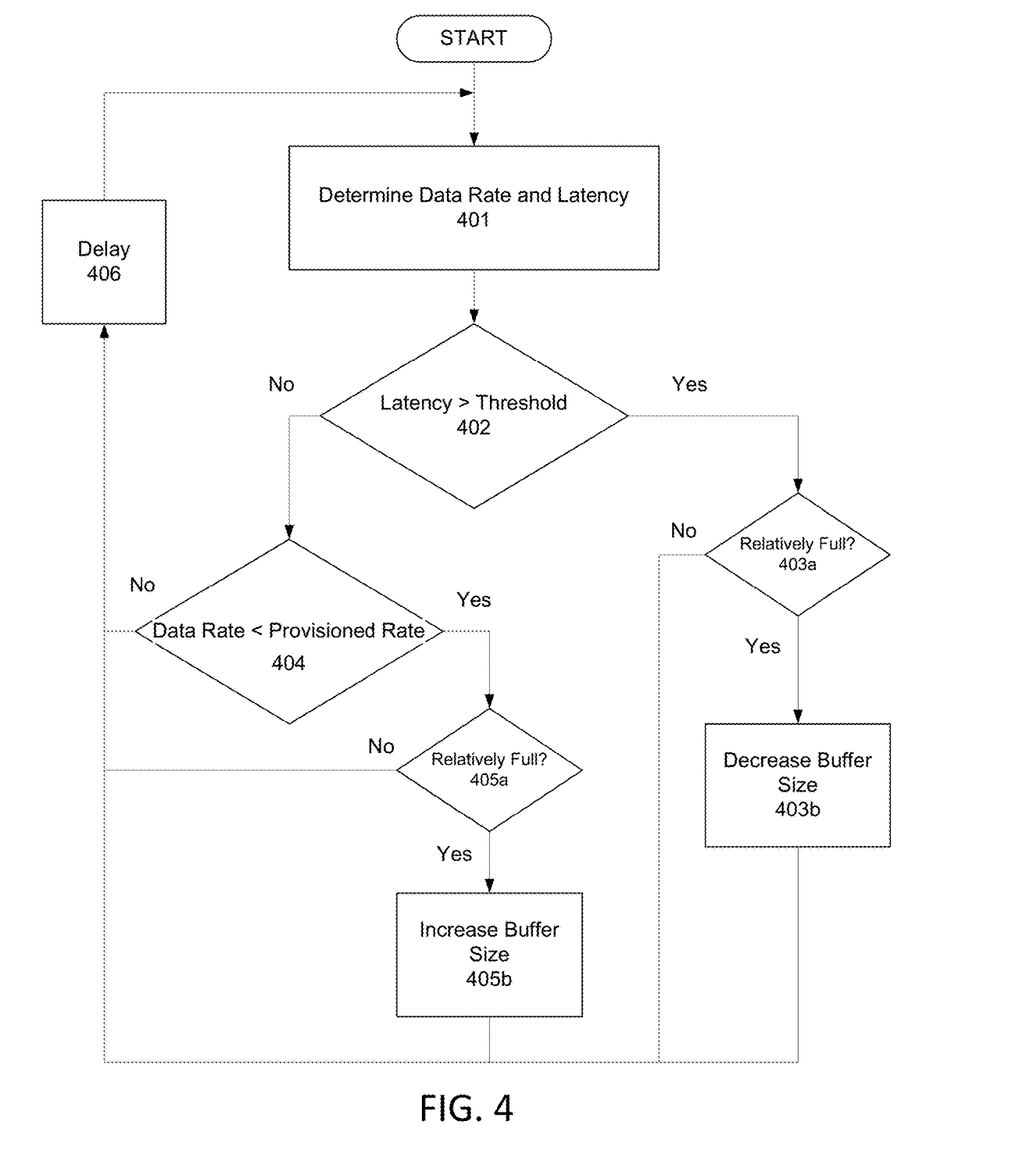
FIG. 4 is a flow diagram illustrating an example method including various steps.

FIG. 4 is a flow diagram illustrating an example method including various steps. The steps in FIG. 4 may be performed by the adaptive buffer controller 303 and/or buffer 302 of FIG. 3. Before the process of FIG. 4 begins, the buffer 302 may be configured or "provisioned" to have an initial size. The initial size may be set by an administrator of a network connected to the buffer 302, a user of the device in which the buffer 302 is implemented, and/or a manufacturer of the device in which the buffer 302 is implemented. The initial size of the buffer 302 is most likely set to be between the minimum possible size and maximum possible size of the buffer 302. In some embodiments, the initial size may be approximately half of the largest size the buffer 302 can have or is expected to reach. For example, if the largest size the buffer 302 can have is 256 KB, then the initial size of the buffer 302 may be set to 128 KB.

The process of FIG. 4 may be initiated when a device containing the buffer 302 and/or adaptive buffer controller 303 is installed, when a power is supplied to such a device, when a packet is received, when the buffer 302 becomes full, when initiated by a user, and/or at a predetermined time after any of the aforementioned occurrences. In step 401, a data rate and latency of packets in the buffer 302 may be determined (e.g., calculated). The data rate and latency may be calculated by the adaptive buffer controller 303. The data rate may be the number of bits transferred by the buffer 302 over a period of time, whereas latency may refer to the time that a packet spends in the buffer 302.

The data rate of packets in the buffer 302 may be calculated by determining the size and number of packets exiting the buffer 302 over a predetermined period of time (e.g., one second). For example, if the number of packets leaving the buffer 302 between time t1 and time t2 is A, then, assuming each of the A packets have the same size (Packet Size), the data rate can be calculated as follows:

$$\text{data rate} = \frac{A * \text{Packet Size}}{|t2 - t1|}$$

Also, the data rate may be obtained from a source such as a management information base (MIB), which collects network information. MIBs are well known in the art, and therefore, further description is omitted.

In one aspect, the latency of packets in the buffer 302 may be calculated from the buffer size, percentage of the buffer occupied, and data rate, according to the following equation:

$$\text{latency} = \frac{\text{buffer size} * \text{percentage of buffer occupied}}{\text{data rate}}$$

For example, if the buffer size is 128 KB, the buffer occupancy is 50%, and the data rate is 2 Mb/s, then the latency is 250 ms.

Alternatively, the latency of packets in the buffer 302 may be calculated by measuring a time that passes from a time a packet enters the buffer 302 to a time that packet exits the buffer 302 (e.g., is accepted by the network in an upstream direction). This measurement may be performed by tagging a packet when it enters the buffer 302 with a tag and monitoring the buffer 302 to identify when the tagged packet leaves the buffer 302. The tag may include a timestamp indicating when the tagged packet entered the buffer 302. Thus, when the tagged packet exits the buffer 302, an exit time may be recorded and compared with the timestamp to calculate the latency (i.e., the time that the tagged packet spent in the buffer 302). Further, the tag may be removed from the packet when in exits the buffer 302.

Alternatively, the tag may include a flag and a timestamp may be recorded when a packet is tagged with the flag. The buffer 302 may be monitored to detect the flag as packets exit the buffer 302. When the flag is detected, the recorded timestamp may be compared with the time that the flag was detected to calculate the latency. Further, the flag may be removed from the packet as it exits the buffer 302.

In some embodiments, multiple packets within the buffer 302 may be tagged. By tagging and tracking multiple packets, the latency can be updated more frequently to give a more accurate representation of the current latency of the buffer 302. Further, in some embodiments, packets to be tracked are selected according to a predetermined sampling of the packets. In other words, every $N^{th}$ (where N is any positive integer) packet may be tagged. For example, timestamps may be added to every $100^{th}$ packet that enters the buffer 302.

Also, the packets that are tracked for purposes of determining the data rate and latency may be generated by the adaptive buffer controller 303. That is, packets may be generated solely for the purpose of calculating the data rate and latency. The generated packets may be input into the buffer 302 in the same manner that other packets are input and the buffer 302 can be monitored to determine when the generated packets exit the buffer 302.

Further, step 401 may be performed to calculate data rate and/or latency for a specific type of packet (e.g., UDP, TCP, etc.). Accordingly, latency may be calculated for one type of packet, while data rate is calculated for another type of packet. Also, in some embodiments, both latency and data rate may be calculated for only one type of packet without regards to other types of packets. Still, in other embodiments, one of latency and data rate may be calculated for a specific type of packet, while the other is calculated for multiple types of packets. For example, latency may be calculated for only UDP packets, while the data rate is calculated with respect to both TCP and UDP packets. In some cases, it may be desirable to improve the latency of a particular type of packet, and thus, the latency for such packets may be calculated separately from the data rate.

In step 402, the latency calculated in step 401 is compared with a predetermined threshold. The predetermined threshold may be set by an administrator of a network connected to the buffer 302, a user of the device in which the buffer 302 is implemented, and/or a manufacturer of the device in which the buffer 302 is implemented. Further, the predetermined threshold may be set in accordance with an expected usage of the buffer 302. That is, if the buffer 302 is expected to be relatively large in size, the predetermined threshold may be set at a value higher than it otherwise would be. In this manner, the process of adaptively controlling the size of the buffer can be restrained from overreacting to insignificant latency.

As mentioned above, in some cases, latency may be calculated for one specific type of packet (e.g., UDP packets). Thus, in such cases, step 402 determines whether the latency for the specific type of packet is greater than the predetermined threshold. Also, the predetermined threshold may be set depending on the type of packet used in calculating the latency. That is, different predetermined thresholds may be assigned for different types of packets.

If the calculated latency is greater than the predetermined threshold (Yes at step 402), then the process optionally proceeds to step 403a. In step 403a, it is determined whether the buffer 302 is relatively full. This determination may be accomplished by comparing an occupancy of the buffer 302 (e.g., the number of packets in the buffer 302) with the current size of the buffer 302. Where the packets in the buffer 302 occupy at least a certain percentage (e.g., 90%) of the buffer 302, the buffer 302 is determined to be relatively full. If it is determined that the buffer 302 is not relatively full (No at step 403a), then one implementation of the process of FIG. 4 may end. Alternatively, instead of ending the process, the size of the buffer 302 may be decreased in step 403b described below. Where the process proceeds to step 403b even though the buffer 302 is not relatively full, the size of the buffer 302 may be decreased by an amount such that packets are not dropped.

If the buffer 302 is determined to be relatively full (Yes at step 403a), then the size of the buffer 302 may be decreased at step 403b. A determination that the calculated latency is greater than the predetermined threshold is effectively a determination that the packets are spending more time in the buffer 302 than is desired. To remedy this problem, the buffer size may be decreased by decreasing the number of bits (or number of packets) the buffer 302 can store at one time. Decreasing the buffer size allows the packets to pass through the buffer 302 more quickly. Where the process proceeds to step 403b, when the buffer 302 is relatively full, the buffer 302 may drop packets. In some embodiments, the packets to be dropped may be selected based upon a priority level. For example, TCP packets may have a lower priority level than UDP packets, and therefore, TCP packets may be dropped from the buffer 302 without dropping UDP packets.

In step 403b, the buffer 302 may be reduced to a predetermined size that is lower than the current buffer size. Thus, whenever the latency is greater than the predetermined threshold, the buffer 302 may be adapted to have a set size, such as 64 KB, 512 KB, 2 MB, 16 MB, etc. In this case, the current size of the buffer 302 is adapted to a predetermined size regardless of the current size of the buffer 302. Alternatively, the size may be reduced by a fraction of the current buffer size (e.g., 50%).

Alternatively, the size of the buffer 302 may be reduced by a predetermined increment at step 403b. For example, the buffer size may be reduced by 128 KB from its current size. Further, the increment may be a set amount, such as 128 KB, 1 MB, 4 MB, etc., or may vary. In cases where the increment varies, the increment may be proportional to the overall size of the buffer 302. In other words, step 403b may reduce the size by a greater increment for a buffer 302 having a greater size. For example, a buffer 302 having a size of 128 KB may be reduced by 64 KB whereas a buffer 302 having a size of 256 KB may be reduced by 128 KB. Still, in other embodiments, the increment may be a function of the latency. That is, the increment by which the size of the buffer 302 is reduced may increase for higher latencies. For example, if the calculated latency is two seconds, then the buffer size may be decreased by 256 KB, whereas if the calculated latency is one-half second then the buffer size may be decreased by just 64 KB. The algorithm used to determine the increment based on buffer size or latency can be set by an administrator of a network connected to the buffer 302, a user of the device in which the buffer 302 is implemented, and/or a manufacturer of the device in which the buffer 302 is implemented. Also, in some embodiments, the process of reducing the buffer size at step 403b may be regulated to prevent the buffer size from dropping below a predefined minimum size. For example, step 403b may reduce the buffer size until a predefined minimum buffer size of 128 KB is reached. By setting a predefined minimum buffer size, the buffer size may be prevented from dropping to 0 KB.

If the calculated latency is less than or equal to the predetermined threshold (No at step 402), then the process proceeds to step 404. In step 404, the calculated data rate is compared with the provisioned data rate. The provisioned data rate may represent a maximum data rate a user should experience given the user's particular tier of service. The provisioned data rate may be set by an administrator of a network connected to the buffer 302, a user of the device in which the buffer 302 is implemented, and/or a manufacturer of the device in which the buffer 302 is implemented.

As mentioned above, in some cases, data rate may be calculated for one specific type of packet (e.g., UDP packets). Thus, in such cases, step 402 determines whether the data rate for the specific type of packet is less than the provisioned data rate. Also, the provisioned data rate may be set depending on the type of packet used in calculating the data rate. That is, different provisioned data rates may be assigned for different types of packets.

If the calculated data rate is less than the provisioned data rate, then the process optionally proceeds to step 405a. In step 405a, it is determined whether the buffer 302 is relatively full. This determination may be made in a similar manner as explained above in step 403a. In some cases, the percentage serving as the basis for the determination of whether or not the buffer 302 is relatively full may be different in step 403a than in step 405a. If it is determined that the buffer 302 is not relatively full (No at step 405a), then the current instance of the process of FIG. 4 may end.

However, if the buffer 302 is determined to be relatively full (Yes at step 405a), then the size of the buffer 302 may be increased at step 405b. A determination that the calculated data rate is less than the provisioned data rate means that the user is not experiencing the full capability of the service he/she has requested. To remedy this problem, the buffer size may be increased by increasing the number of bits the buffer 302 can store at one time. Increasing the buffer size allows the buffer 302 to transfer more packets in a given amount of time.

Thus, whenever the data rate is less than the provisioned data rate, the buffer 302 may be adapted to have a set size, such as 64 KB, 256 KB, 2 MB, 4 MB, etc. In this case, the current size of the buffer 302 may be adapted to a predetermined size regardless of the current size of the buffer 302.

Alternatively, the size of the buffer 302 may be increased by a predetermined increment at step 405b. For example, the buffer size may be increased by 128 KB from its current size. Further, the increment may be a set amount, such as 128 KB, or may vary. In some embodiments, the increment may be proportional to the overall size of the buffer 302. In other words, step 405b may increase the size by a greater increment for a buffer 302 having a smaller size. For example, a buffer 302 having a size of 128 KB may be increased by 128 KB whereas a buffer 302 having a size of 256 KB may be increased by 64 KB. Still, in other embodiments, the increment may be a function of the calculated data rate. That is, the increment by which the size of the buffer 302 is increased may increase for lower calculated data rates. For example, if the calculated data rate is 1 Mbps, then the buffer size may be increased by 64 KB, whereas if the calculated data rate is 56 Kbps then the buffer size may be increased by 128 KB. The algorithm used to determine the increment based on buffer size or the calculated data rate can be set by an administrator of a network connected to the buffer 302, a user of the device in which the buffer 302 is implemented, and/or a manufacturer of the device in which the buffer 302 is implemented.

When steps 403b or 405b are complete, when the buffer 302 is not relatively full at step 403a, when the buffer 302 is not relatively full at step 405a, or when the latency is not greater than the predetermined threshold (No at step 402) and the data rate is not less than the provisioned data rate (No at step 404), the current instance of the process of adaptively controlling the buffer size may end. However, an end of the current instance does not necessarily correspond to an end of the process of adapting the buffer 302. Another instance of the process may be performed to further adapt the buffer size. That is, the steps of FIG. 4 may be continuously repeated to monitor the state of the buffer 302 in order to adaptively control the buffer size. As shown in FIG. 4, a delay 406 may exist between each instance of the process. The delay 406 may be a fixed or variable delay. Further, with each instance of the process of FIG. 4, the predetermined threshold and provisioned data rate may change. The values for these parameters may be changed by an administrator of a network connected to the buffer 302, a user of the device in which the buffer 302 is implemented, and/or a manufacturer of the device in which the buffer 302 is implemented.

Figure 5:
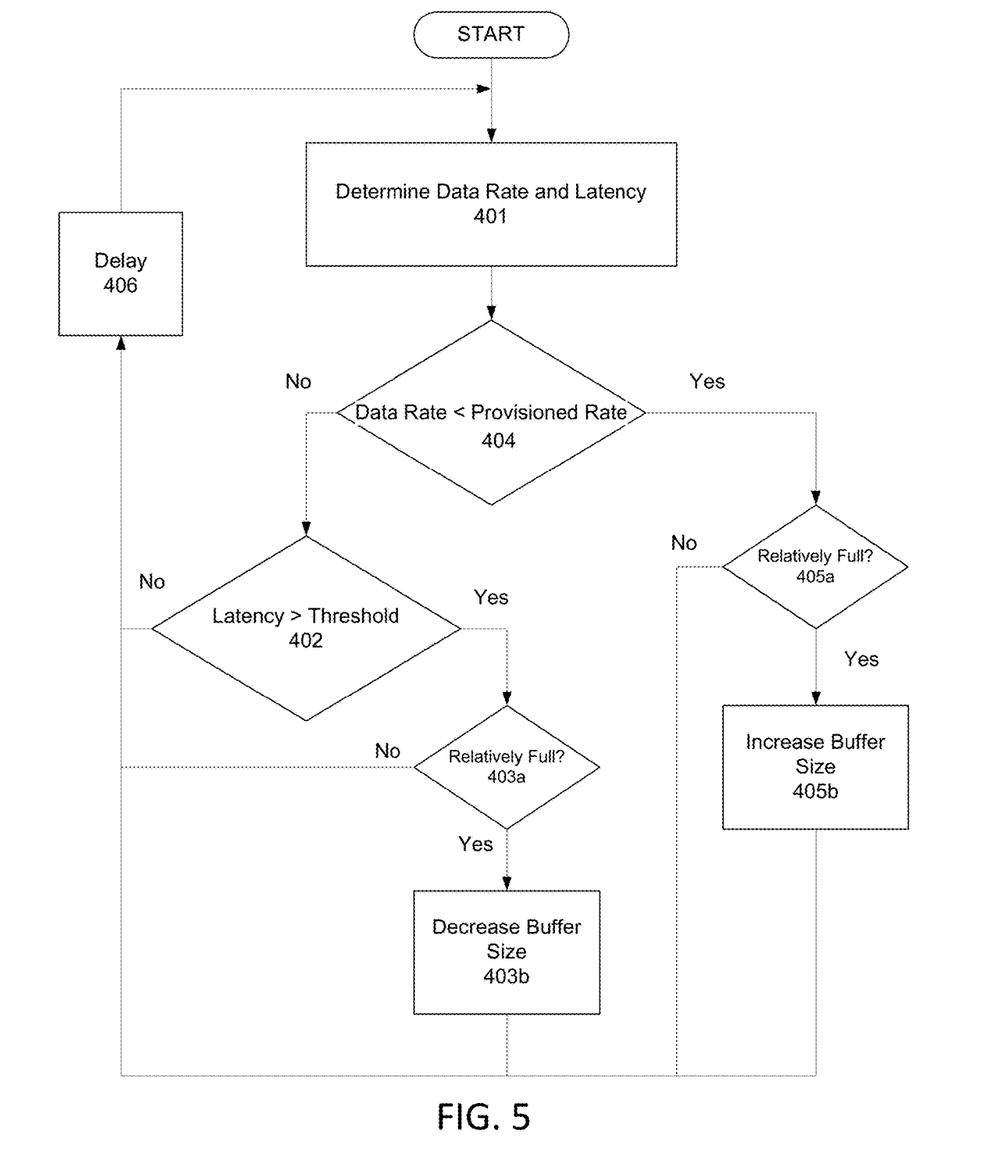
FIG. 5 is a flow diagram illustrating another example method including various steps.

FIG. 5 is another flow diagram illustrating an example method. The example of FIG. 5 is similar to the example of FIG. 4, except that the comparison of the data rate with the provisioned data rate is performed before the comparison of the latency with the predetermined threshold. Accordingly, the buffer 302 may be increased to a size that allows the data rate to reach the provisioned data rate, before checking the latency of the buffer 302. The steps in FIG. 5 having the same reference characters as those in FIG. 4 may be performed in the same manner as described with reference to FIG. 4, and therefore, further description of these steps is omitted.

Figure 6:
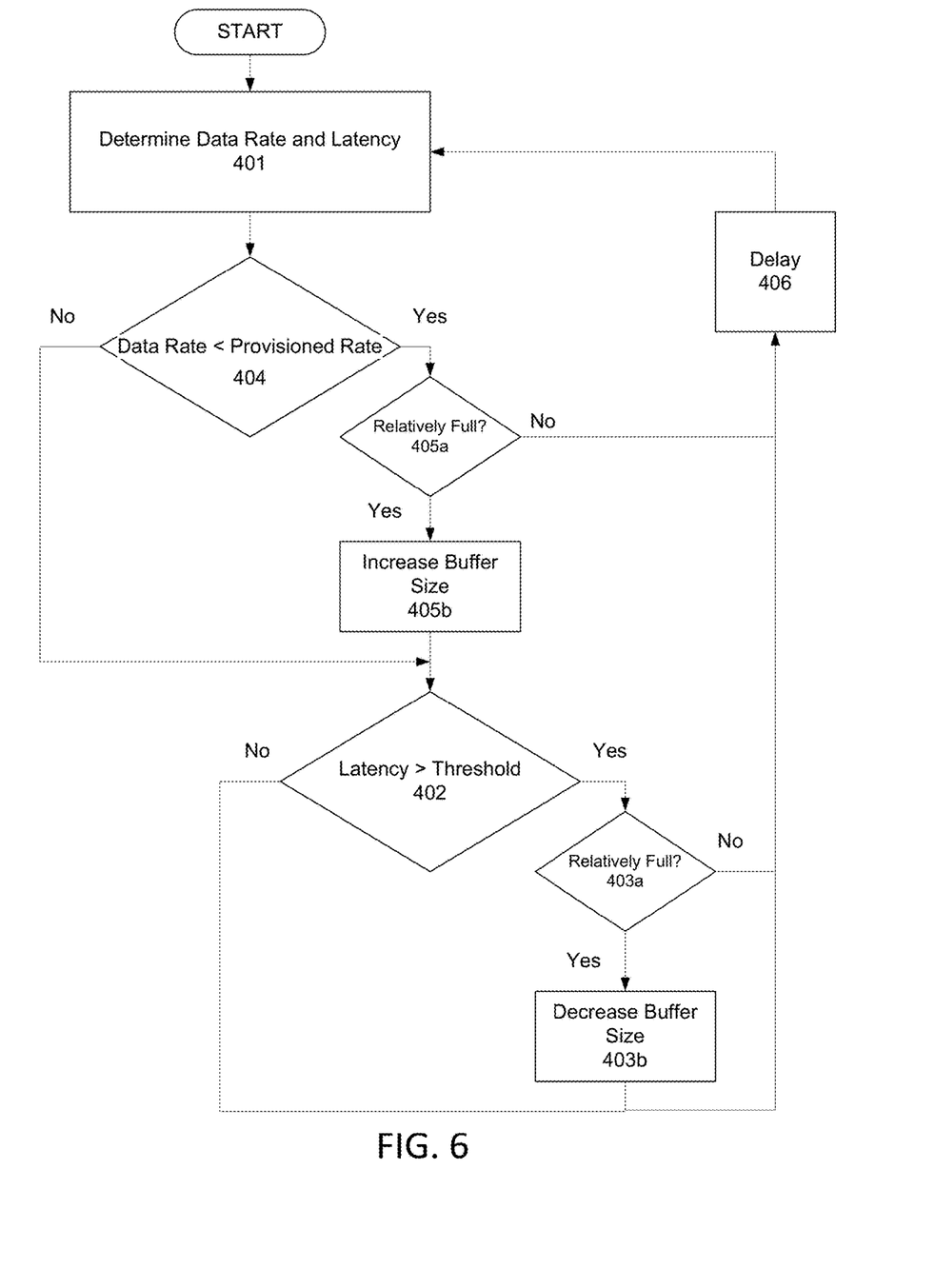
FIG. 6 is a flow diagram illustrating still another example method including various steps.

FIG. 6 is yet another flow diagram illustrating an example method. The example of FIG. 6 is similar to the example of FIG. 5, except that the comparison of the latency with the predetermined threshold is done regardless of the result of the comparison of the data rate with the provisioned data rate. That is, in the process of FIG. 6, the buffer size may be increased first and then decreased based upon measurements taken at the same time at step 401. In other words, after the buffer size is increased in step 405*b*, the buffer size can be decreased without having to recalculate the data rate and latency.

In some embodiments, the buffer size may be decreased in step 403*b* by an amount greater than the amount it is increased in step 405*b*. Accordingly, although the buffer size may be increased in step 405*b*, the end result of the process shown in FIG. 6 may decrease the buffer size.

Again, the steps in FIG. 6 having the same reference characters as those in FIGS. 4 and 5 may be performed in the same manner as described with reference to FIG. 4, and therefore, further description of these steps is omitted.

Figure 7:
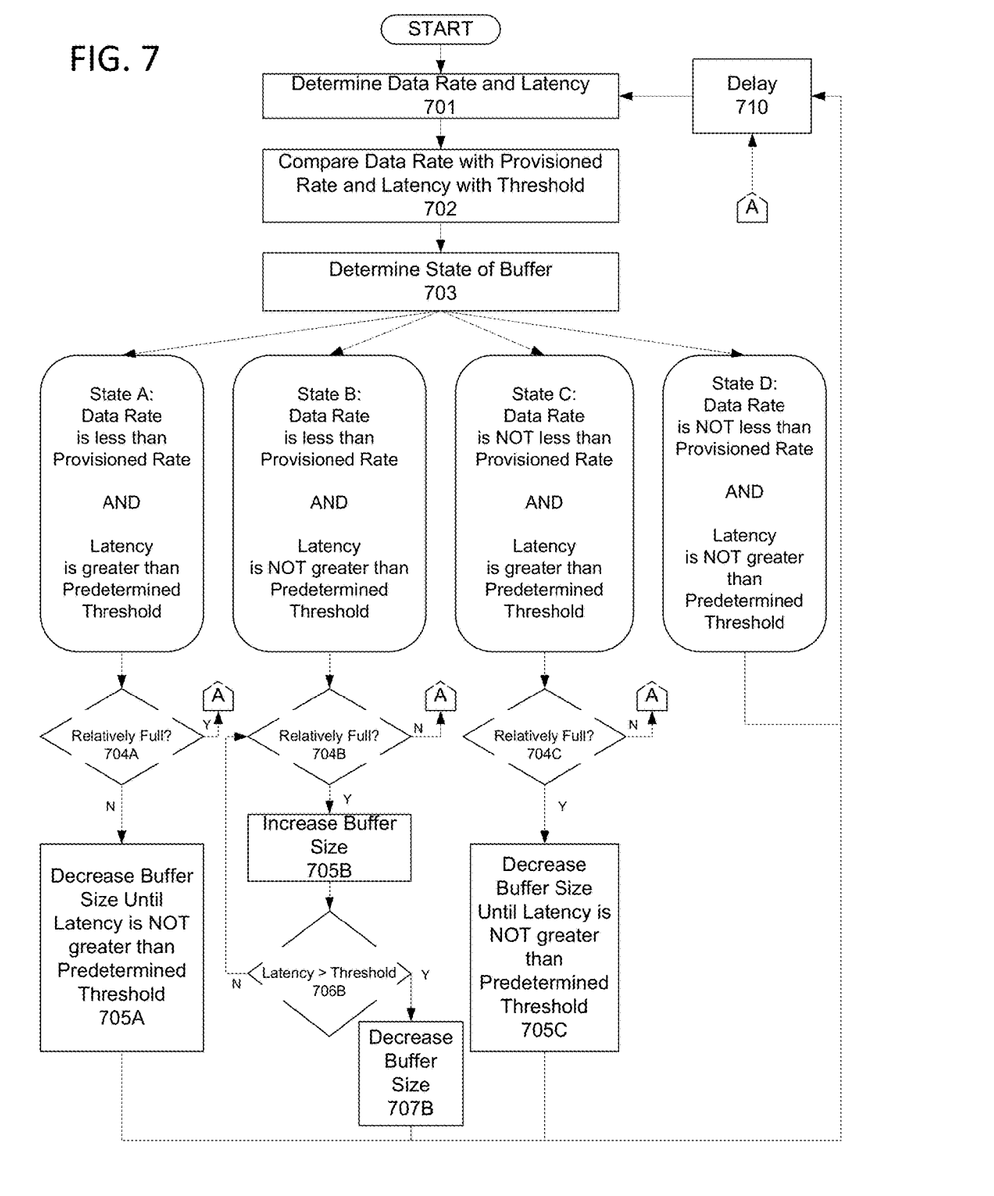
FIG. 7 is a flow diagram illustrating yet another example method including various steps.

FIG. 7 shows still another example method. The method begins with step 701 in which the data rate and latency of packets in the buffer 302 are calculated. Step 701 may be performed in a similar manner as step 401. Also, as in step 401, step 701 may include calculating the data rate and/or latency for a specific type of packet (e.g., UDP packets) from among various types of packets that may be temporarily stored in the buffer 302. The data rate and latency may be calculated by the adaptive buffer controller 303 of FIG. 3.

Next, in step 702, the data rate is compared with a provisioned data rate while the latency is compared with a predetermined threshold. In one or more embodiments, these comparisons may be performed simultaneously. In other embodiments, these comparisons may be performed consecutively in either order.

After step 702, the state of the buffer 302 is determined in step 703. Specifically, step 703 determines which one of four different states (States A, B, C, and D) the buffer 302 is in based on the comparison results of step 702.

The buffer 302 may be in State A when the data rate is less than the provisioned data rate and the latency is greater than the predetermined threshold. If step 703 determines that the buffer is in State A, the buffer 302 may be evaluated to determine whether it is relatively full in step 704A. If the buffer is not relatively full (N at step 704A), the size of the buffer 302 may be decreased in step 705A. Here, the buffer size may be decreased incrementally by a small amount until the latency is no longer greater than the predetermined threshold. In other words, in step 705A, the buffer size may be decreased and the latency of packets in the decreased buffer 302 may be re-calculated and compared with the predetermined threshold repeatedly until the latency is acceptable (i.e., until it is less than or equal to the predetermined threshold). By incrementally decreasing the buffer size and checking the latency for each increment, an optimal buffer size may be achieved. Notably, in the example method illustrated in FIG. 7, the buffer size may be decreased even though the calculated data rate is less than the provisioned data rate.

Also, if the buffer 302 is determined to be relatively full in step 704A, the process of FIG. 7 may end or may return to step 701 after a delay in step 710. Alternatively, the size of the buffer 302 may be decreased in step 705A regardless of whether or not the buffer 302 is relatively full. Where the process proceeds to step 705A even though the buffer 302 is relatively full, the buffer 302 may drop particular packets. In some embodiments, the packets to be dropped may be selected based upon a priority level. For example, TCP packets may have a lower priority level than UDP packets, and therefore, TCP packets may be dropped from the buffer 302 without dropping UDP packets.

The buffer 302 may be in State B when the data rate is less than the provisioned data rate and the latency is not greater than the predetermined threshold. If step 703 determines that the buffer is in State B, the buffer 302 may be evaluated to determine whether it is relatively full in step 704B. If the buffer is relatively full (Y at step 704B), the size of the buffer may be increased in step 705B. Otherwise (N at step 704B), the process of FIG. 7 may end or may return to step 701 after a delay in step 710. When step 705B is performed, the buffer size may be increased by a fixed amount or by a variable amount depending on the calculated data rate, the calculated latency, or the present size of the buffer 302.

In one or more embodiments, the incremental amount may vary with each increase. That is, the incremental amount may correspond to how much less the latency is than the predetermined threshold. For example, if the latency is much lower than the predetermined threshold, then the incremental amount by which the buffer size is increased may be large in comparison to the incremental amount the buffer size is increased when the latency is just slightly less than the predetermined threshold.

After the size of the buffer 302 is increased at step 705B, the latency may be calculated again and the re-calculated latency may be compared with the predetermined threshold at step 706B. A slight delay (step 710) of a fixed or variable delay may be implemented before recalculating the latency. If the latency is still not greater than the predetermined threshold (N at step 706B), the method may return to step 704B. The method may repeat steps 704B, 705B, and 706B, until the latency becomes greater than the predetermined threshold. When this occurs (Y at step 706B), the buffer size is decreased at step 707B. The amount that the buffer 302 is decreased may be less than the amount that the buffer size was increased in the immediately preceding instance of step 705B. In this manner, the size of the buffer 302 can converge to an optimal size.

The buffer 302 may be in State C when the data rate is not less than the provisioned data rate and the latency is greater than the predetermined threshold. If step 703 determines that the buffer is in State C, the buffer 302 may be evaluated to determine whether it is relatively full in step 704C. If the buffer is relatively full (Y at step 704C), the size of the buffer 302 may be decreased in step 705C. Here, the buffer size may be decreased incrementally by a small amount until the latency is no longer greater than the predetermined threshold. In other words, in step 705C, the buffer size may be decreased and the latency of packets in the decreased buffer 302 may be re-calculated and compared with the predetermined threshold repeatedly until the latency is acceptable (i.e., until it is less than or equal to the predetermined threshold). By incrementally decreasing the buffer size and checking the latency for each increment, an optimal buffer size may be achieved.

Also, if it is determined that the buffer 302 is not relatively full in step 704C (N at step 704C), the process of FIG. 7 may end or may return to step 701 after a delay in step 710. Alternatively, the size of the buffer 302 may be decreased in step 705C regardless of whether or not the buffer 302 is relatively full. Where the process proceeds to step 705C even though the buffer 302 is relatively full, the buffer 302 may drop particular packets. In some embodiments, the packets to be dropped may be selected based upon a priority level. For example, TCP packets may have a lower priority level than UDP packets, and therefore, TCP packets may be dropped from the buffer 302 without dropping UDP packets.

The buffer 302 may be in State D when the data rate is greater than or equal to the provisioned data rate and the latency is less than or equal to the predetermined threshold. If step 703 determines that the buffer is in State D, the size of the buffer may not be changed. State D may be the desired state of the buffer. In this case, the process of FIG. 7 may end or may return to step 701 after a delay in step 710. The delay in step 710 may be a fixed or variable delay. Further, the delay in step 710 may be controlled to prevent excessive processing while still adequately adapting the buffer size.

Figure 8:
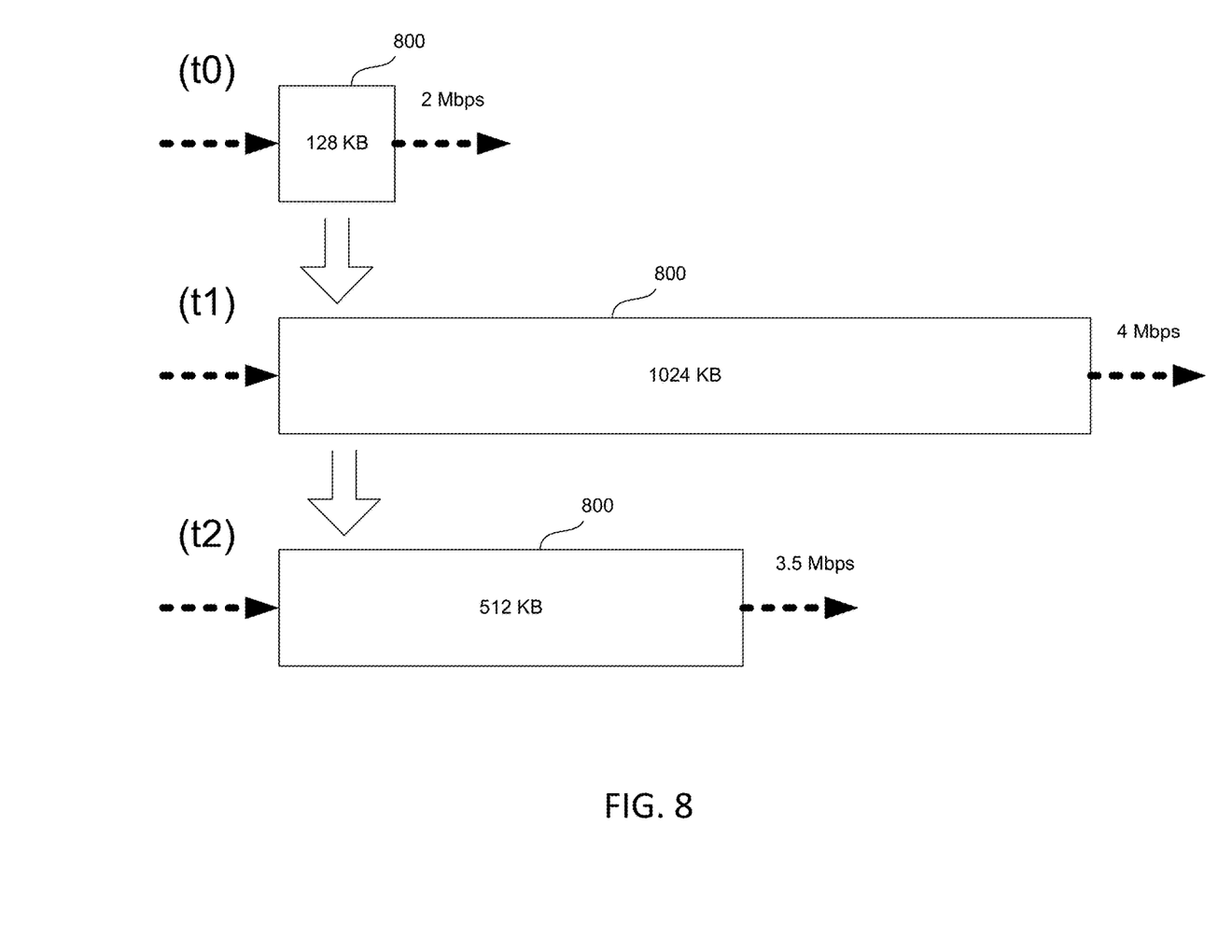
FIG. 8 is a high-level diagram illustrating changes that an adaptive buffer may undergo.

FIG. 8 illustrates a high-level diagram of an adaptive buffer 800 at three different times. It should be understood that the sizes of the adaptive buffer 800 of FIG. 8 are examples and that any size may be implemented. As shown in FIG. 8, the buffer 800 has a size of 128 KB at time t0. The time t0 may be a time at which a network device, such as a modem is turned on or activated. The data rate and latency of packets in the buffer 800 may be determined and compared with an existing (e.g., a provisioned) data rate and a predetermined threshold. In the embodiment of FIG. 8, packets in the buffer at time t0 have a calculated data rate of 2 Mbps. Here, the calculated data rate is determined to be less than the provisioned data rate and the latency is determined to be less than a predetermined threshold. As a result of these determinations, the size of the buffer 800 is increased at time t1.

As shown in FIG. 8, at time t1, the buffer 800 is increased to a size of 1024 KB, and its data rate becomes 4 Mbps. While the increased data rate may be closer to the provisioned data rate, the latency may increase as well. In this case, increasing the buffer 800 causes the latency to become greater than the predetermined threshold. Thus, in order to improve the latency, the size of the buffer 800 is decreased to 512 KB at time t2. Meanwhile, the data rate of the buffer 800 decreases to 3.5 Mbps. Notably, the change in data rate may not be proportional to the change in buffer size. Further, as evidenced in FIG. 8, the size of the buffer 800 can be incrementally adjusted to identify a buffer size having an improved data rate and an acceptable latency.

The principles exemplified above can be applied to various devices, such as local and network DVRs, packet switches, routers, gateways, modems, servers, and other devices that have built-in packet buffers. Further, it should be understood to those of ordinary skill in the art that the buffer may be implemented with various types of memory, including DRAM, SRAM, flash memory, ROM, etc.

Although example embodiments are described above, the various features and steps may be combined, divided, omitted, and/or augmented in any desired manner, depending on the specific buffer characteristics desired. For example, steps 403a and/or 405a may be omitted, so that the buffer 302 is decreased or increased in steps 403b and 405b, respectively, without first checking whether the buffer is relatively full. This patent should not be limited to the example embodiments described, but rather should have its scope determined by the claims that follow:

We claim:
1. A method comprising:
    determining, by a computing device, a data rate of one or more packets flowing through a buffer;
    determining a latency of the one or more packets flowing through the buffer;
    comparing the data rate with a provisioned data rate that is based on a tier of service;
    comparing the latency with a threshold; and
    in response to a determination that the data rate is less than the provisioned data rate and that the latency is less than the threshold, increasing a number of bits allocated to the buffer by a first increment if a first number of bits are allocated to the buffer at a time of a determination to increase the number of bits or by a second increment if a second number of bits are allocated to the buffer at the time of the determination to increase the number of bits, wherein the first increment is greater than the second increment and the first number is less than the second number.
2. The method of claim 1, wherein the determining the data rate comprises determining a data rate of one or more User Datagram Protocol (UDP) packets and one or more Transmission Control Protocol (TCP) packets.
3. The method of claim 1, wherein the determining the latency comprises determining the latency of only a specific type of packet from among various types of packets within the buffer.
4. The method of claim 3, wherein the specific type of packet is a User Datagram Protocol (UDP) packet, and wherein the various types of packets comprise one or more UDP packets and one or more Transmission Control Protocol (TCP) packets.
5. The method of claim 1, wherein the comparing the data rate with the provisioned data rate is responsive to the determination that the latency is less than the threshold.
6. The method of claim 1, further comprising setting an initial size of the buffer to be approximately half of its maximum size limit.
7. The method of claim 1, wherein the determining the latency comprises:
    recording a first time at which a first packet of the one or more packets enters the buffer;
    recording a second time at which the first packet exits the buffer; and calculating a difference between the first time and the second time.

8. The method of claim 7, further comprising selecting the first packet from the one or more packets according to a predetermined sampling.

9. The method of claim 7, wherein the determining the latency further comprises:
generating the first packet.

10. The method of claim 1, wherein the increasing comprises increasing the number of bits allocated to the buffer by a percentage of a size of the buffer at the time of the determination to increase the number of bits.

11. The method of claim 1, further comprising transmitting, by a second computing device, the one or more packets upstream after the one or more packets exit the buffer.

12. The method of claim 1, further comprising:
receiving, by a second computing device, the one or more packets; and
inputting the one or more packets into the buffer.

13. The method of claim 1, wherein the provisioned data rate comprises a maximum data rate a user is entitled to experience for a communication over a network based on the tier of service for which the user has paid.

14. The method of claim 1, further comprising:
determining, by the computing device, a second data rate of one or more second packets flowing through a second buffer;
determining a second latency of the one or more second packets flowing through the second buffer; and
adapting a size of the second buffer based on the second data rate and the second latency.

15. The method of claim 1, wherein the determining the data rate comprises determining a number of the one or more packets exiting the buffer over a period of time, wherein the period of time is different from the latency.

16. The method of claim 1, wherein the determining the data rate is performed after the determining the latency.

17. The method of claim 1, wherein the comparing the data rate with the provisioned data rate and the comparing the latency with the threshold are performed simultaneously.

18. The method of claim 1, further comprising, after the increasing the number of bits allocated to the buffer:
determining a second data rate of one or more second packets flowing through the buffer;
determining a second latency of the one or more second packets flowing through the buffer;
comparing the second data rate with the provisioned data rate;
comparing the second latency with the threshold; and
adapting a size of the buffer in response to a result of the comparing the second data rate with the provisioned data rate and a result of the comparing the second latency with the threshold.

19. The method of claim 1, further comprising, after the increasing the number of bits allocated to the buffer:
determining a second data rate of one or more second packets flowing through the buffer;
determining a second latency of the one or more second packets flowing through the buffer;
comparing the second data rate with a second provisioned data rate different from the provisioned data rate;
comparing the second latency with the threshold; and
adapting a size of the buffer in response to a result of the comparing the second data rate with the second provisioned data rate and a result of the comparing the second latency with the threshold.

20. The method of claim 1, further comprising, after the increasing the number of bits allocated to the buffer:
determining a second data rate of one or more second packets flowing through the buffer;
determining a second latency of the one or more second packets flowing through the buffer;
comparing the second data rate with the provisioned data rate;
comparing the second latency with a second threshold different from the threshold; and
adapting a size of the buffer in response to a result of the comparing the second data rate with the provisioned data rate and a result of the comparing the second latency with the second threshold.

21. The method of claim 1, further comprising repeating, after a delay:
the determining the data rate;
the determining the latency;
the comparing the data rate with the provisioned data rate;
the comparing the latency with the threshold; and
the increasing the number of bits allocated to the buffer.

22. The method of claim 1, further comprising:
in response to the increasing the number of bits allocated to the buffer, determining an updated latency associated with the buffer;
comparing the updated latency with the threshold; and
in response to a determination that the updated latency is greater than the threshold, decreasing the number of bits allocated to the buffer.

23. The method of claim 1, further comprising:
increasing the number of bits allocated to the buffer until the data rate is greater than or equal to the provisioned data rate.

24. A method comprising:
determining, by a computing device, a data rate of one or more packets flowing through a buffer;
determining a latency of the one or more packets flowing through the buffer;
comparing the data rate with a first provisioned data rate that is based on a tier of service;
comparing the latency with a first threshold; and
in response to a determination that the data rate is greater than the provisioned data rate and that the latency is greater than the first threshold, decreasing a number of bits allocated to the buffer by a first increment if a first number of bits are allocated to the buffer at a time of a determination to decrease the number of bits or by a second increment if a second number of bits are allocated to the buffer at the time of the determination to decrease the number of bits, wherein the first increment is greater than the second increment and the first number is greater than the second number.

25. The method of claim 24, wherein the decreasing the number of bits allocated to the buffer comprises:
selecting at least one packet in the buffer to drop based on priority levels associated with different types of packets.

26. The method of claim 24,
wherein the one or more packets comprise one or more first type of packets, and
wherein the method further comprises:
determining a second data rate of one or more second type of packets flowing through the buffer after at least one of the one or more first type of packets flows through the buffer;
determining a second latency of the one or more second type of packets flowing through the buffer;

comparing the second data rate with a second provisioned data rate;
comparing the second latency with a second threshold; and
changing the number of bits allocated to the buffer in response to a result of the comparing the second data rate with the second provisioned data rate and a result of the comparing the second latency with the second threshold.

27. The method of claim 26,
wherein the first provisioned data rate and the second provisioned data rate are different,
wherein the first threshold and the second threshold are different, and
wherein the one or more first type of packets comprise one or more user datagram protocol (UDP) packets and the one or more second type of packets comprise one or more transmission control protocol (TCP) packets.

28. The method of claim 26, wherein the second provisioned data rate is different from the first provisioned data rate.

29. The method of claim 26, wherein the second threshold is different from the first threshold.

30. The method of claim 24, further comprising:
decreasing the number of bits allocated to the buffer until the latency is less than or equal to the first threshold.

31. A method comprising:
determining, by a computing device, a data rate of one or more packets exiting a buffer;
determining a latency of the buffer;
determining whether the data rate is less than a predetermined data rate that is based on a tier of service;
in response to a determination that the data rate is less than the predetermined data rate and a determination that an occupancy of the buffer is greater than a first threshold, increasing a number of bits allocated to the buffer;
in response to the increasing, determining whether the latency is greater than a second threshold; and
in response to a determination that the latency is greater than the second threshold, decreasing the number of bits allocated to the buffer.

32. The method of claim 31, wherein the determining the data rate comprises obtaining the data rate from a management information base (MIB).

33. The method of claim 31, wherein the determining the latency is performed after the increasing the number of bits allocated to the buffer.

34. The method of claim 31, further comprising determining the predetermined data rate prior to the determining the data rate and the determining the latency.

35. The method of claim 31, wherein the increasing the number of bits allocated to the buffer comprises increasing the number of bits allocated to the buffer by a first increment if a first number of bits are allocated to the buffer at a time of a determination to increase the number of bits or by a second increment if a second number of bits are allocated to the buffer at the time of the determination to increase the number of bits, wherein the first increment is greater than the second increment and the first number is less than the second number.

36. A method comprising:
determining, by a computing device, a data rate of one or more packets flowing through a buffer;
determining a latency of the one or more packets flowing through the buffer;
comparing the data rate with a provisioned data rate that is based on a tier of service;
comparing the latency with a threshold; and
in response to a determination that the data rate is less than the provisioned data rate and that the latency is less than the threshold, increasing a number of bits allocated to the buffer by a first increment if the data rate is a first data rate or by a second increment if the data rate is a second data rate, wherein the first increment is greater than the second increment and the first data rate is less than the second data rate.

* * * * *